(12) United States Patent
Keller

(10) Patent No.: US 6,735,664 B1
(45) Date of Patent: May 11, 2004

(54) INDIRECT ADDRESSING METHOD AND DEVICE INCORPORATING THE SAME

(75) Inventor: Philip J. Keller, Fremont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 609 days.

(21) Appl. No.: 09/691,377

(22) Filed: Oct. 18, 2000

(51) Int. Cl.[7] .............................................. G06F 12/00
(52) U.S. Cl. .................. 711/5; 711/2; 711/165
(58) Field of Search ................. 711/2, 5, 165; 710/11

(56) References Cited

U.S. PATENT DOCUMENTS

| | | | |
|---|---|---|---|
| 5,734,858 A | * | 3/1998 | Patrick et al. .............. 711/208 |
| 5,890,222 A | | 3/1999 | Agarwal et al. | |

OTHER PUBLICATIONS

Frazier, H.M., Jr.; Media Independent Interface: Concepts and Guidelines, WESCON/'95. Conference record, pp 348–353.*

* cited by examiner

Primary Examiner—Donald Sparks
Assistant Examiner—Bao Q. Truong
(74) Attorney, Agent, or Firm—Renner, Otto, Boisselle & Sklar, LLP

(57) ABSTRACT

A method of indirect addressing involves use of a bank select register and a bank of multiple directly-accessible registers to indirectly access registers of a memory device. Bank select data is written to the bank control register, specifying a bank of registers to be indirectly accessed. Read and/or write operations are then performed, for example, reading data from the specified bank of registers and transferring it to the bank of directly-accessible registers, or writing data to the bank of directly-accessible registers from an external source, and transferring the data to the registers of the specified bank.

8 Claims, 9 Drawing Sheets

46

| ADDRESS | NAME |
|---|---|
| 0 | Control |
| 1 | Status |
| 2,3 | PHY Identifier |
| 4 | Auto-Negotiation Advertisement |
| 5 | Auto-Negotiation Link Partner Ability |
| 6 | Auto-Negotiation Expansion |
| 7 | Auto-Negotiation Next Page Transmit |
| 8-15 | Reserved |
| 16-30 | Vendor Specific |
| 31 | Bank Select |

| | | BANK NUMBER | | | | |
|---|---|---|---|---|---|---|
| | | 0 | 1 | 2 | 3 | 1024 |
| REGISTER | 0 | | | | | |
| | 1 | | | | | |
| | 2 | | | | | |
| | 3 | | | | | |
| | 4 | | | | | |
| | 5 | | | | | |
| | 6 | | | | | |
| | ⋮ | | | | | |
| | 14 | | | | | |

FIG. 3

INDIRECT ADDRESSING METHOD AND DEVICE INCORPORATING THE SAME

BACKGROUND OF THE INVENTION

1. Technical Field

The present invention relates to devices and methods for accessing registers of memory devices.

2. Description of the Related Art

IEEE Standard 802.3u-1995, section 22.2.4, describes a medium independent interface (MII) management interface for controlling a physical layer device (PHY) and gathering status information from the PHY. The MII management register set includes 16 sixteen-bit vendor-specified memory registers, for a total of 256 bits. The vendor-specified registers may be used to store control parameters used to enhance operation of the PHY.

For complex PHYs, the 256 bits of vendor-specified space in the MII management register set may be inadequate for storing desired information such as numerous control parameters. Accordingly, it would be desirable to have a means of effectively increasing the accessible memory space. Moreover, it will be appreciated that there is a general need for efficiently accessing specific registers or blocks of registers within a memory device.

SUMMARY OF THE INVENTION

A method of indirect addressing involves use of a bank select register and a bank of multiple directly-accessible registers to indirectly access registers of a memory device. Bank select data is written to the bank select register, specifying a bank of registers to be indirectly accessed. Read and/or write operations are then performed, for example, reading data from the specified bank of registers and transferring it to the directly-accessible registers, or writing data to the directly-accessible registers from an external source, and transferring the data to the registers of the specified bank of indirectly-accessible registers.

According to an aspect of the invention, a method of indirect addressing involves performing read and/or write operations between a bank of directly-accessible registers and a specified bank of indirectly-accessible registers. According to a specific embodiment of the invention, the bank of indirectly-accessible registers is specified by placing bank control data in a directly-accessible bank select register.

According to another aspect of the invention, a PHY device has an indirectly-accessible extended memory register set which is operatively coupled to a directly-accessible memory register set. According to a specific embodiment of the invention, the directly-accessible memory register set is an MII management register set which is operatively coupled to an MII.

According to yet another aspect of the invention, a method of performing an operation on indirectly-accessible registers of a memory device includes the steps of: storing bank select information in a directly-accessible bank select register, the bank select information corresponding to a bank of the indirectly-accessible registers; and exchanging data between other directly-accessible registers and the indirectly-accessible registers of the bank.

According to still another aspect of the invention, a method of performing an operation on indirectly-accessible registers of a physical layer device includes the steps of: sending bank select information to the physical layer device via a medium independent interface (MII) of the device; storing the bank select information in a bank select register of an MII management register set of the device; and exchanging data between other registers of the MII management register set, and multiple of the indirectly-accessible registers indicated by the bank select information.

According to a further aspect of the invention, a physical layer device includes a medium independent interface (MII); an indirectly-accessible memory device having multiple banks of registers, each of the banks having multiple registers; and means for selectively accessing one or more of the banks via the MII.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings:

FIG. 2 is a diagram of the MII management register set of the PHY device shown in FIG. 1;

FIG. 3 illustrates the extended memory register set of the PHY device shown in FIG. 1;

DETAILED DESCRIPTION

As described below in greater detail, an indirect addressing method allows improved indirect accessing of registers within a memory device. In the example below, the method utilizes a management register set accessible through a medium independent interface (MII) of a physical layer device (PHY or PHY device). However, it will be appreciated that the method as described below is but one exemplary application of the concepts described herein, and that the indirect addressing method or variations thereof may be employed in a wide variety of devices and/or situations.

Figure 1:
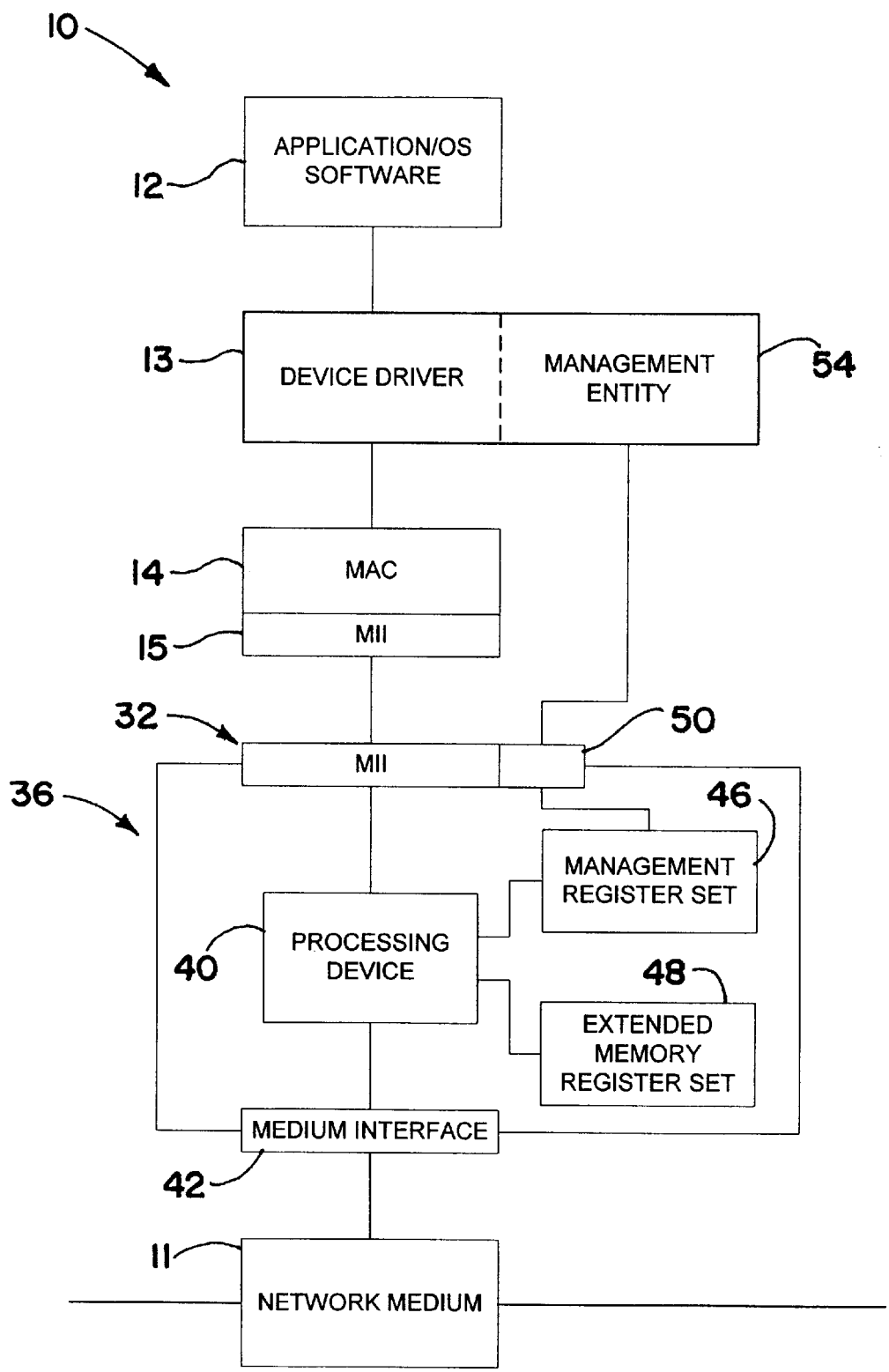
FIG. 1 is a block diagram of a network interface system which includes a PHY device utilizing the indirect addressing method of the present invention.

Referring initially to FIG. 1, a block diagram of a network interface system 10 is shown. The network interface system 10 is a means for connecting a device, such as a host computer, to a network medium 11. In the host computer or other device, data from operating system or application software 12 is received and processed by a software device driver 13. The operating system or application software 12 creates data and notifies a driver interface that data is waiting to be sent to a specific node of the network. The driver interface may reformat the data as necessary, and sends the data to the device driver 13 via a defined interface, for example via an interface following the NDIS (Network Driver Interface Specification) or ODI (Open Data-link Interface) specifications. The device driver 13 may reconfigure the data into a format compatible with the interface devices downstream toward the network medium 11, and may create and add header information such as source and destination addresses, and data transmission speed. The device driver 13 may also divide data from the software 12 into frames or packets of suitable length.

The frames or packets pass from the device driver 13 to a media access controller (MAC) 14. The MAC 14 may be part of a network interface card which is installed in the host computer. The MAC 14 may prepend or append additional information to packets received from the device driver arrangement 13. For example, the MAC may calculate and append some form of frame check sequence (FCS), such as a cyclic redundancy check (CRC), to the frames or packets.

The MAC 14 includes a media independent interface (MII) 15 operably coupled to a corresponding MII 32 on a physical layer device (PHY) 36. The MIIs 15 and 32 are capable of passing data and other information between the MAC 14 and the PHY 36. The terms "media independent interface" and "MII" as used herein, are intended to include variations on the standard MII, such as the reduced media independent interface (RMII) and the serial media independent interface (SMII).

As is conventional, the PHY 36 is used to format data to be sent on the network medium 11, and is used as well to receive and interpret data received from the network medium, for example data having been sent by PHYs of other network interface devices. The sending and receiving of data by the PHY 36 may be controlled by various control parameters, such as the parameters affecting the gain used in sending data and the rate at which data is sent or received. The control parameters may be used by a processing device 40, such as a state machine or microsequencer, which is part of the PHY 36. The processing device 40 passes data to and receives data from the network medium 11 via a medium interface 42.

The PHY 36 includes a pair of memory devices, a directly-accessible management register set 46 and an indirectly-accessible extended memory register set 48. The memory devices 46 and 48 are coupled to the processing device 40, and enable storage of information used in and regarding operation of the PHY 36. For example, the memory devices 46 and 48 may be used to store the control parameters referred to above.

The management register set 46 is operatively coupled to an MII management interface 50 which is part of the MII 32. The MII management interface 50 is, in turn, operatively coupled to a management entity 54. The MII management interface 50 provides a simple, two-wire, serial interface to connect the management entity 54 and the PHY 36 for the purposes for controlling the PHY and gathering status information from the PHY. The management entity 54 may be operatively coupled to the device driver 13, and in fact may be a part of the device driver, the functions of the management entity 54 for example being part of the code of the software device driver.

The MII management register set 46 and the MII management interface 50 may be as specified in IEEE Standard 802.3u-1995, section 22.2.4, which is incorporated herein by reference. Therein is specified a pair of signals that physically transport management information across an MII, a frame format, and a protocol specification for exchanging management frames or packets, and a register set that can be read and written using these frames or packets. It will be appreciated, however, that other physical transport mechanisms and/or protocol specifications may alternatively be employed.

Turning now to FIG. 2, the MII management register set 46 includes 32 sixteen-bit registers. As specified in IEEE Standard 802.3u-1995, register addresses 0–7 are assigned to specified management functions. Registers 8–15 are reserved, although it will be understood that other IEEE standards may utilize some or all of these registers for storage of control- and/or function-related information.

Register addresses 16–31 are specified in IEEE Standard 802.3u-1995 as being vendor-specific addresses. In the particular management register set 46 of the present invention, these vendor-specific registers may be used for additional storage, or as temporary data storage registers or shadow registers, used for transporting information to and/or receiving information from registers of the extended memory register set 48. Thus, the registers 16–31 of the management register set 46 may be used, and are used in the invention, as part of an indirect addressing scheme to access the registers of the extended memory 48.

Referring to FIG. 3, the extended memory register set 48 may be divided into banks, each of the banks including 15 sixteen-bit registers. Register 31 of the management register set 46 is a bank select register, information stored therein being used to specify one or more particular banks of the extended memory register set 48 upon which read and/or write operations are to be performed. The registers 16–30 of the management register set 46 may be used to store information to be written to the one or more banks of the extended memory register set 48; also, the registers 16–30 of the management register set 46 may be used to store data read from a particular bank of the extended memory register set 48. Providing an extended memory register set 48, which may be directly or indirectly accessed from the registers 16–31 of the management register set 46, greatly increases the amount of data, such as control data, which may be stored in the PHY 36 and accessed via the MII 32, when compared with the 256 bits directly accessible in the vendor-specified A portion of a conventional MII management register set.

It will be appreciated that the MII management register set 46 and the extended memory register set 48 may be combined in a single memory device, if so desired.

One or more methods may be employed for handling the transfer of data (reads and writes) between the MII management register set 46 and the extended memory register set 48. Examples of various types of suitable methods are described below. It will be appreciated that one or more of the methods may be used in an actual device.

Figure 4:
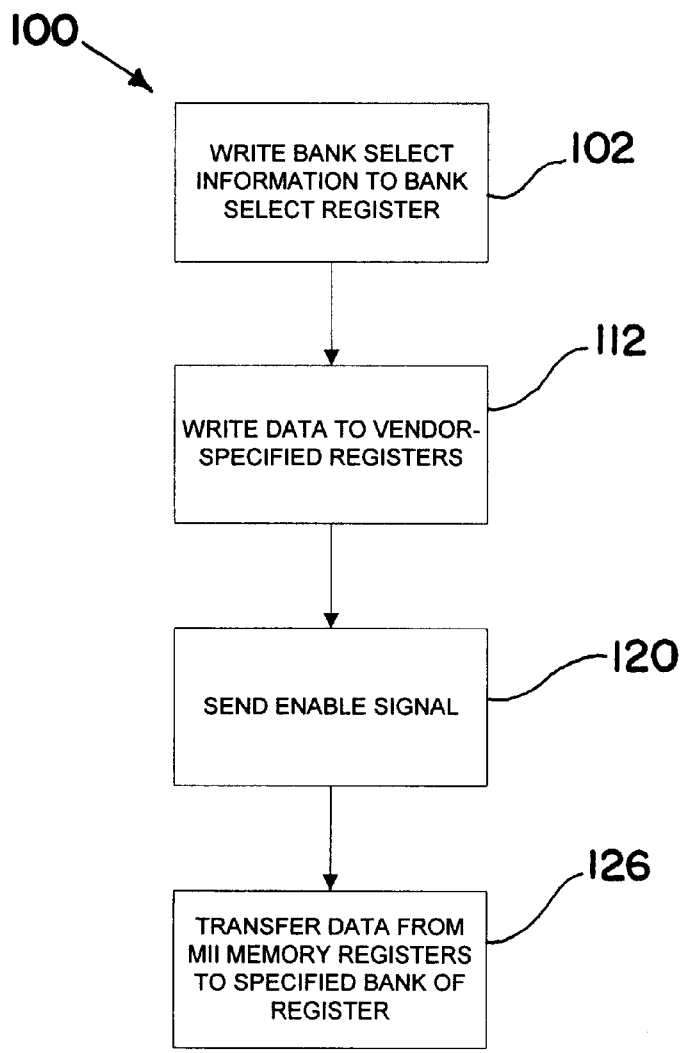
FIG. 4 is a flowchart illustrating the steps of a multi-register write operation embodying the present invention.

FIG. 4 is a flowchart illustrating the steps of a method 100 for performing a multi-register write operation to the extended memory register set 48, indirectly accessing the extended memory register set via the management register set 46. A multi-register write operation may be utilized, for example, in updating a counter which is stored in two or more registers. If the counter were to be updated one register at a time, inaccuracies and unpredictable behavior of the device might result. These difficulties may be minimized or avoided by updating all the registers of the counter at one time.

Figure 5:
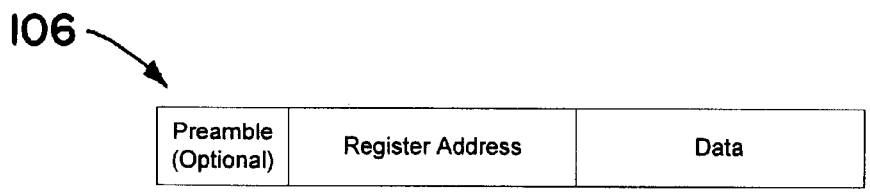
FIG. 5 shows a prior art MII management frame format which may be utilized in the method of FIG. 4.
Figure 6:
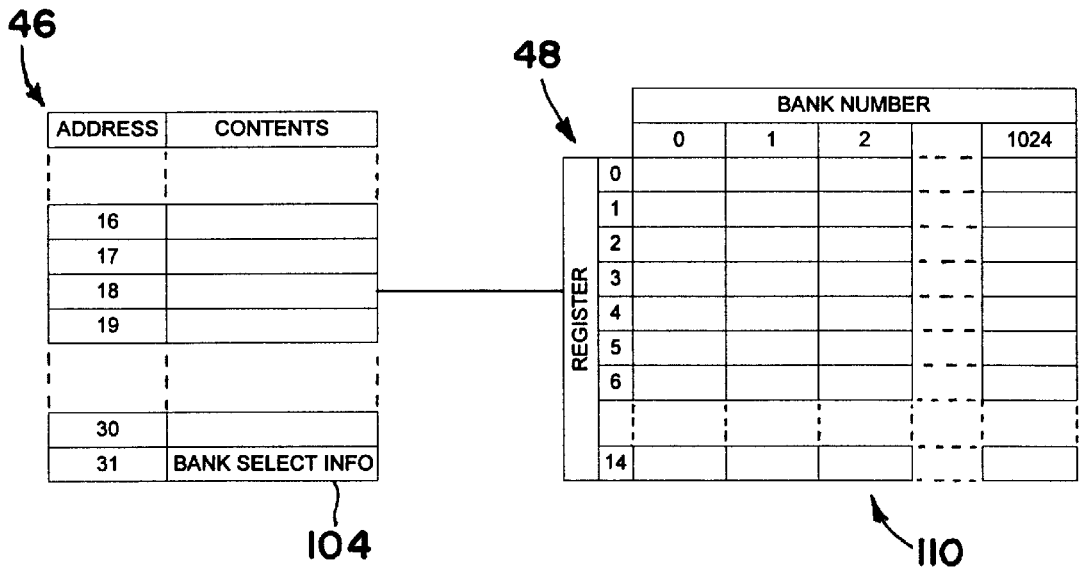
FIGS. 6–8 are schematic diagrams illustrating various of the steps of the method of FIG. 4.

In step 102 of the method 100, bank select data or information 104 (FIG. 6) is written, for example by the management entity 54, to the bank select register 31 of the management register set 46. The information may be sent using an MII management frame of a conventional format, such as an MII management frame format 106, as illustrated in FIG. 5. The results of step 102 are illustrated in FIG. 6. It will be understood that the bank select information 104 sent to the bank select register in step 102 includes an indicator corresponding to and specifying a bank 110 of the extended memory register set 48 to be acted upon through read and/or write operations. The bank select information 104 may also include instructions as to whether the operation is a read operation or a write operation.

The bank select information may further include instructions regarding other banks of the extended memory register set 48. For example, the bank select information 104 may include information specifying that the write operation is to be performed for the specified bank of registers, and additionally for one or more preceding and/or succeeding banks of registers.

Figure 7:
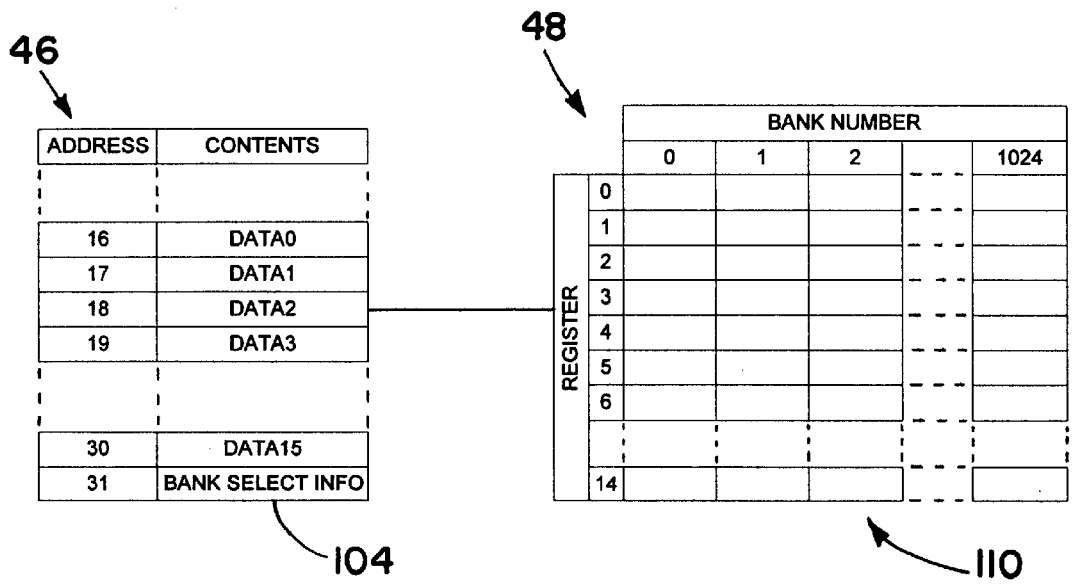
Figure 8:
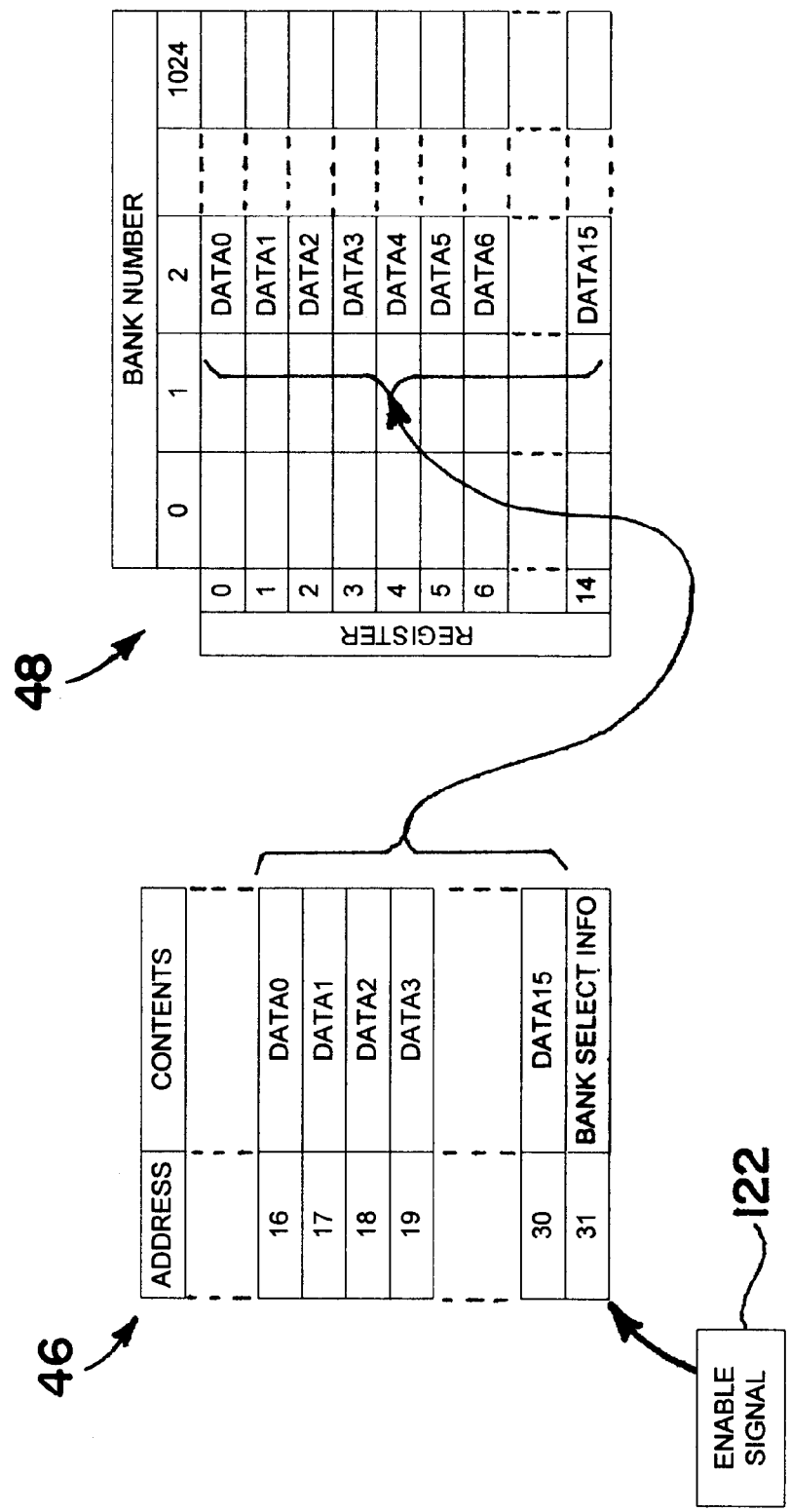

In step 112, write operations are performed, for example by the management entity 54, to send data or other contents to some or all of the vendor-specified registers 16–30 of the management register set 46, as illustrated in FIG. 7. Thereafter, in step 120, an enable signal 122 is sent, for example by the management entity 54, that triggers step 126, transfer of data from the registers 16–30 of the management register set 46 to the specified bank 110 of registers of the extended memory register set 48. These steps are illustrated in FIG. 8. The enable signal 122 may include writing an enable bit to a specified position of the bank select register 31 of the management register set 46. The detection of the enable signal 122 and the transfer of the data from the registers 16–30 of the management register set 46 to the bank 110 of the extended memory register set 48 may be accomplished via use of the processing device 40 in a manner or manners well known to those skilled in the art.

It is clear in from above description that the use of the bank select register 31 of the MII management register set 46 facilitates efficient transfer of data to the extended memory register set 48. The bank select information 104 need only be sent once to write information to all of the registers of the selected bank 110 of the extended memory register set 48. Thus, storage of the bank select information 104 in the bank select register 31 of the MII management register set 46 avoids the need to send the bank select information separately for each register of the extended memory register set 48 that is indirectly accessed, and may avoid or minimize problems that may result from piecemeal sending of data.

It will be appreciated that variations on the above-described method 100 are possible. For example, the bank select information 104 may be sent after the writing of contents 16–30 of the MII management register set 46, and may be sent in conjunction with the enable signal 122. Further, the enable signal 122 may specify that only some of the registers of the selected bank 110 are to be updated, and may specify which bank or banks of the selected bank 110 are to be updated.

Figure 9:
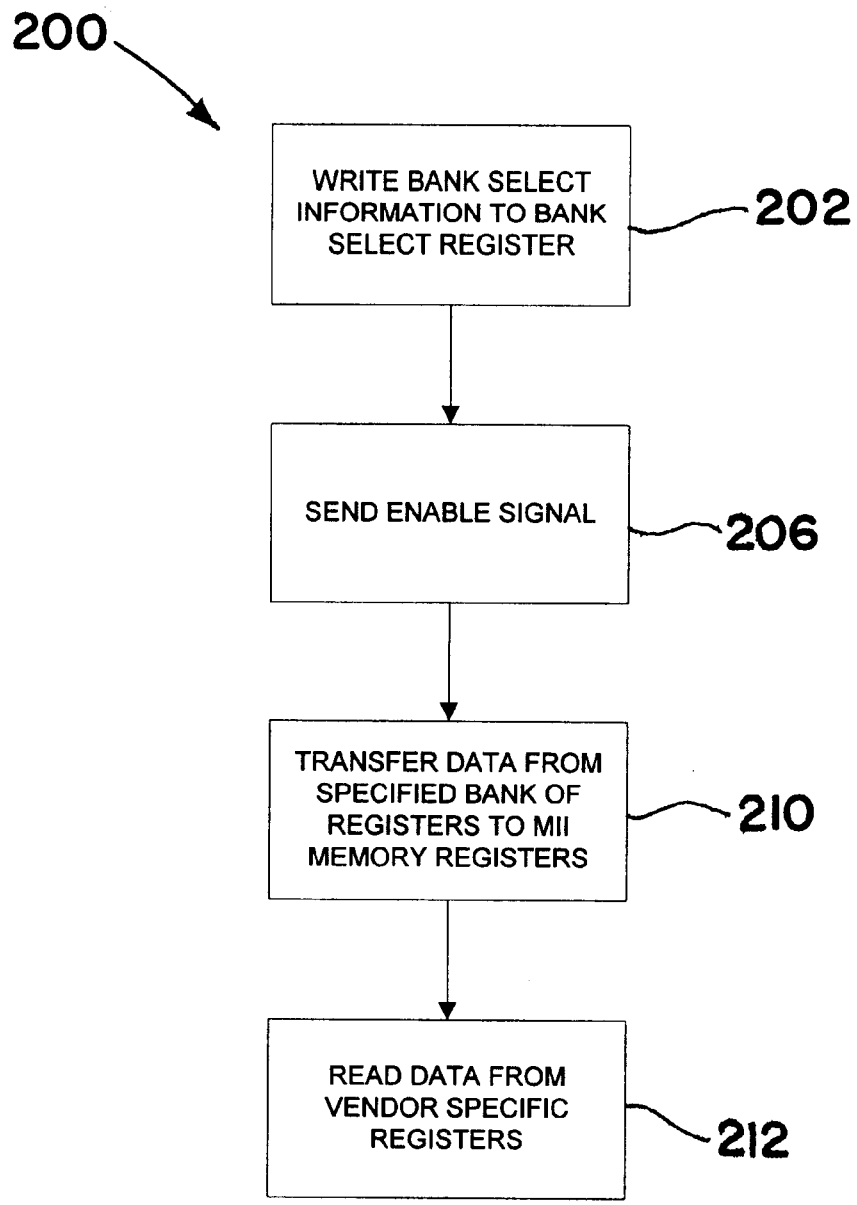
FIG. 9 is a flowchart illustrating the steps of a multi-register read operation embodying the present invention.

Turning now to FIG. 9, a high-level flowchart is shown illustrating the steps of a method 200 for performing a multi-register read operation on a specified bank 201 (FIG. 10) of the extended memory register set 48, utilizing the registers 16–31 of the management register set 46 in an indirect addressing scheme. It will be appreciated that transferring multiple registers of data from the specified bank 201 to the registers 16–30 of the management register set 46, prior to the transfer of that information to the management entity 54 via the MII management interface 50, avoids or minimizes problems which may be associated with piecemeal retrieval of data from registers of the specified bank 201.

Figure 10:
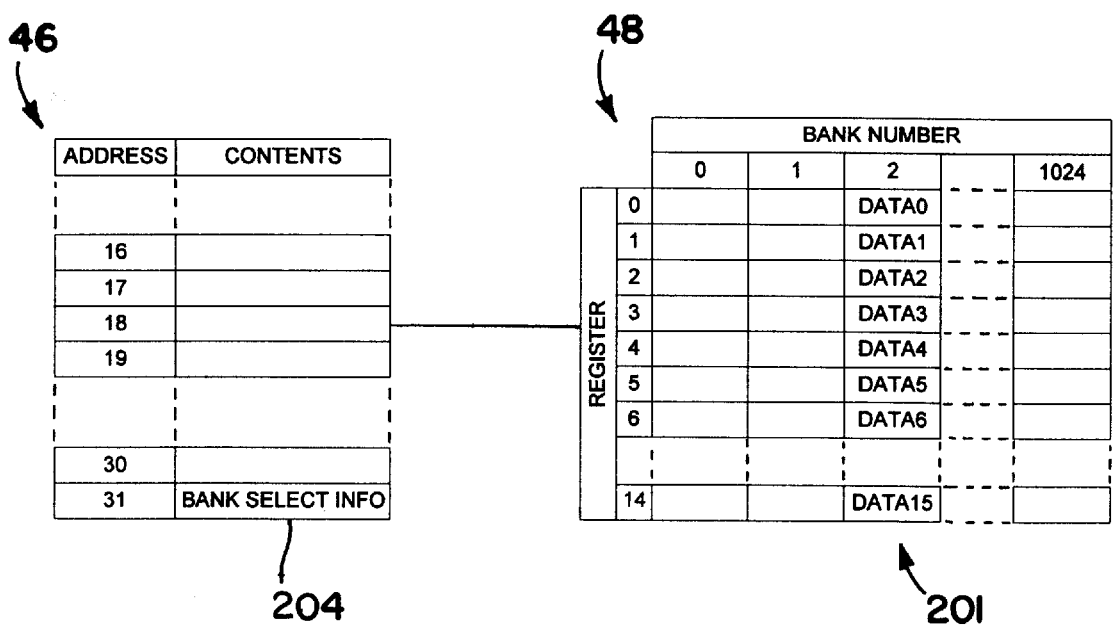
FIGS. 10 and 11 are schematic diagrams illustrating various of the steps of the method of FIG. 9.

In step 202, bank select data or information 204 is sent, for example by the management entity 54, to the bank select register 31 of the MII management register set 46, as illustrated in FIG. 10. The bank select data 204 may include information specifying the bank 201 of the extended memory register set 48 to be read from, as well as possibly including other instructions regarding the read operation, as suggested by the above description with the regard to the step 102 of the method 100.

Figure 11:
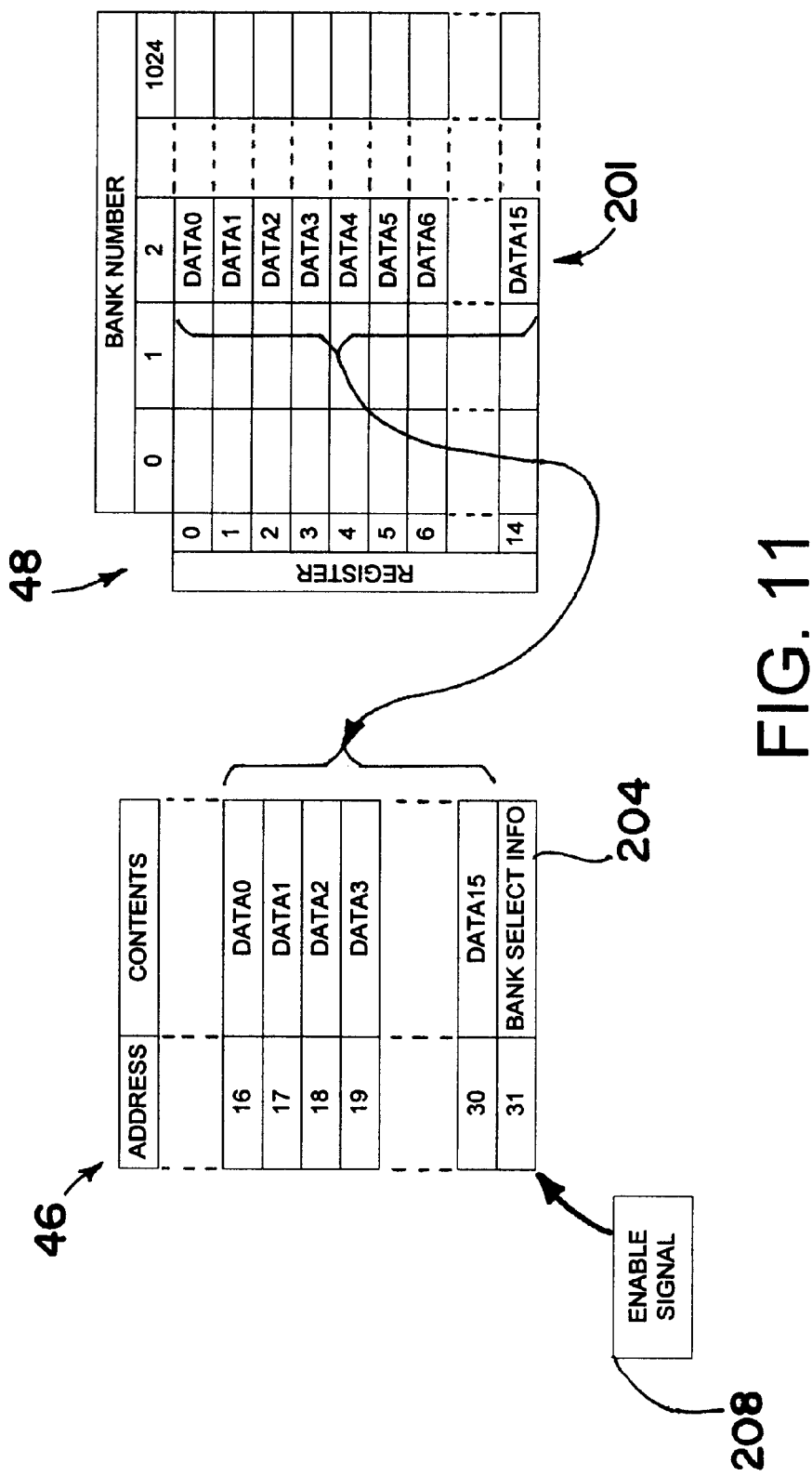

In step 206 an enable signal 208 is sent, for example by the management entity 54, triggering the read operation. It will be appreciated that it may be possible to combine the steps 202 and 206 into a single step. Thereafter, in step 210, data from the registers of the specified bank 201 of the extended memory register set 48 are written to the registers 16–30 of the MII management register set 46. The steps 206 and 210 illustrated in FIG. 11. The step 210 may be accomplished utilizing the processing device 40. It will be appreciated that the data in the registers 16–30 of the MII management register set 46 may then be read in step 212, and passed to the management entity 54 via the MII management interface 50.

It will be appreciated that the methods described above are merely exemplary, and that various other operations are possible. For example, the bank select data or information may specify both read and write operations, for instance, specifying a read from one specified bank of registers of the extended memory register set 48, followed by a write operation to another specified bank of registers.

It will further be appreciated that the methods described above may be modified so as to perform read and/or write operations to only a portion of the bank, if desired. For example, a control register may be utilized to specify one or more registers of a specific bank to have read and/or write operations performed upon.

Figure 12:
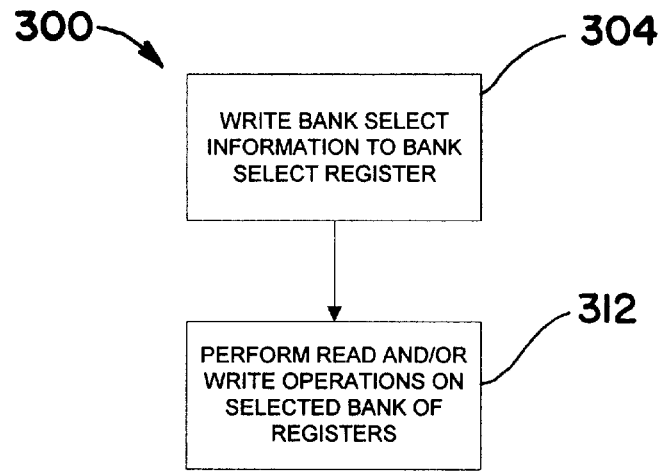
FIG. 12 is a flowchart illustrating the steps of a single-register operation embodying the present invention.
Figure 13:
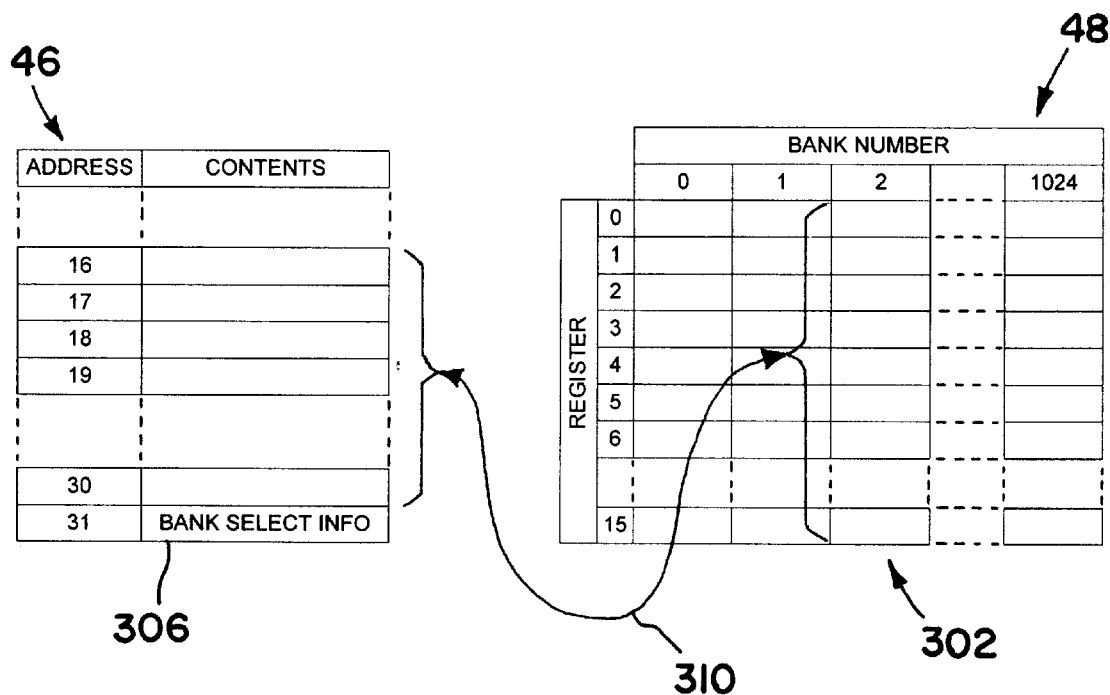
FIG. 13 is a schematic diagram illustrating the method of FIG. 12.

Referring to FIG. 12, a high-level flow chart is shown illustrating the steps of a method 300 for performing read and/or write operations on a specified bank 302 (FIG. 13) of the extended memory register set 48. In the method 300 the read and/or operations are performed on the specified bank 302 without waiting for an enable signal. Thus in the method 300 the registers 16–30 of the management register set 46 are directly coupled to the registers of the specified bank 302. This coupling is accomplished via an indirect addressing scheme utilizing the bank select register 31 of the MII management register set 46.

In step 304 of the method 300, bank select data or information 306 is sent to the bank select register 31 of the MII management register set 46. The bank select data 306 includes data specifying the bank 302 of the extended memory register set 46 to be read from or to be written to. In addition, the bank select data 306 may include data regarding whether read operations or write operations are to be performed.

In the method 300, unlike the methods 100 and 200 described above, a link 310 is made between the registers 16–30 of the MII management register set 46, and the registers of the specified bank 302, such that data may be transferred between the management entity and the registers of the specified bank 302, without use of an enable signal. Thus the link may include directly coupling the registers 16–30 and the registers of the specified bank 302 such that instructions to preform read operations to, or write operations from, the registers 16–30, are transformed by the processing device 40 into corresponding operations on the corresponding registers of the specified bank 302. Thus in step 312 read and/or write operations may be performed on the registers of the specified bank.

It will be appreciated that the PHY 36 may employ multi-register read and write operations such as described in the methods 100 and 200, or single-register read and write operations such as described in the method 300. Alternatively, it will be appreciated that multi-register operations and single-register operations may be combined in the same device. For example, the processing device 40 may be configured to make only multi-register reads and writes to certain register banks, while allowing single-register reads and writes to other register banks. Further, it will be appreciated the processing device 40 may be configured to allow selection between multi-register operations and single-register operations. For example, a bit of the bank select register may be assigned for indication of whether read and write operations will be single-register operations or multi-register operations.

In an exemplary embodiment, the bank select data includes 10 bits for specifying the bank of the extended memory register set 48. This enables the extended memory register set 48 to have as many as 1,024 banks of 15 sixteen-bit registers.

It will be appreciated that variance of the above-described methods may be employed in a wide variety of memory devices and situations. The application of the method is not limited to any specific configuration of memory device, but may be employed in a wide variety of circumstances where indirect addressing is desirable.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of performing an operation on indirectly-accessible registers of a memory device, the method comprising:

storing bank select information in a directly-accessible bank select register, the bank select information corresponding to a bank of the indirectly-accessible registers; and transferring data between other directly-accessible registers and the indirectly-accessible registers of the bank;

wherein the transferring data includes transferring the data between a single directly-accessible register of the other directly-accessible registers and a single indirectly-accessible register of the indirectly-accessible registers of the bank, in response to receipt an external signal.

2. The method of claim 1, wherein the external signal is a signal for a read from or write to one of the directly-accessible registers.

3. A method of performing an operation on indirectly-accessible registers of a memory device, the method comprising:

storing bank select information in a directly-accessible bank select register, the bank select information corresponding to a bank of the indirectly-accessible registers;

transferring data between other directly-accessible registers and the indirectly-accessible registers of the bank; and prior to the transferring, sending an enable signal to trigger the transferring;

wherein the sending includes sending the enable signal to the bank select register.

4. The method of claim 3, further comprising, prior to the transferring, writing control information to one or more of the multiple directly-accessible registers.

5. The method of claim 4, wherein the writing includes sending the control information to the bank select register via a medium independent interface (MII).

6. The method of claim 5, wherein the sending includes sending the control information in a management data frame.

7. The method of claim 3, wherein the bank includes a plurality of contiguous registers, and wherein the transferring includes transferring data between the other directly-accessible registers and all of the registers of the bank, in a single operation.

8. A method of performing an operation on indirectly-accessible registers of a physical layer device, the method comprising:

sending bank select information to the physical layer device via a medium independent interface (MII) of the device;

storing the bank select information in a bank select register of an MII management register set of the device;

transferring data between other registers of the MII management register set, and multiple of the indirectly-accessible registers indicated by the bank select information; and prior to the transferring, sending an enable signal to trigger the transferring;

wherein the sending includes sending the enable signal to the bank select register.

* * * * *